June 25, 1968          J. E. CLEMENS          3,389,602
FUEL GAUGING SYSTEM FOR WEIGHTLESS TANKAGES
Filed April 20, 1964          2 Sheets-Sheet 1
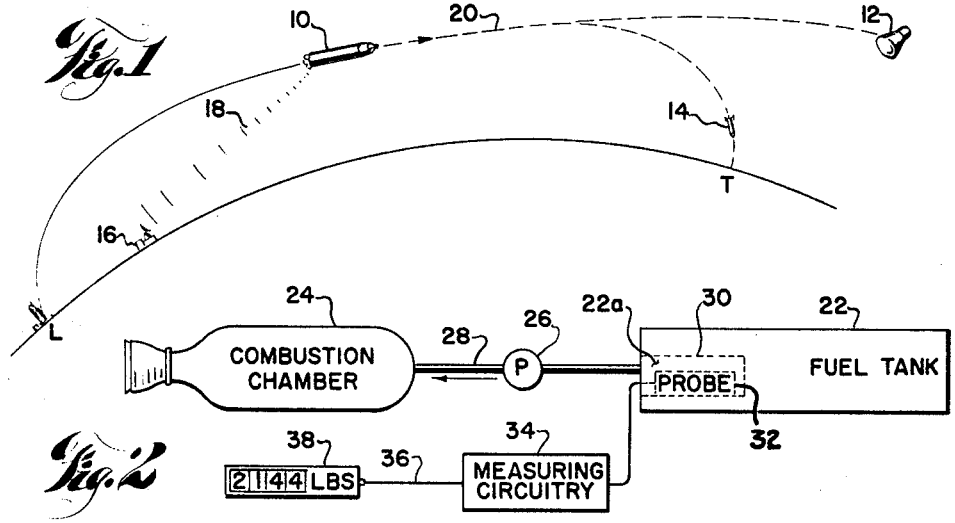
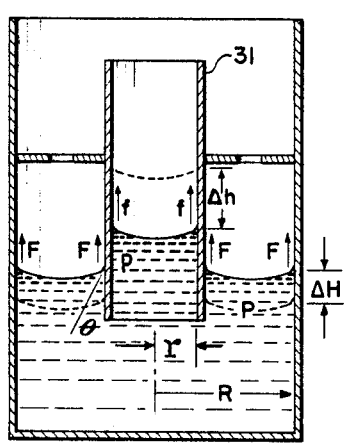
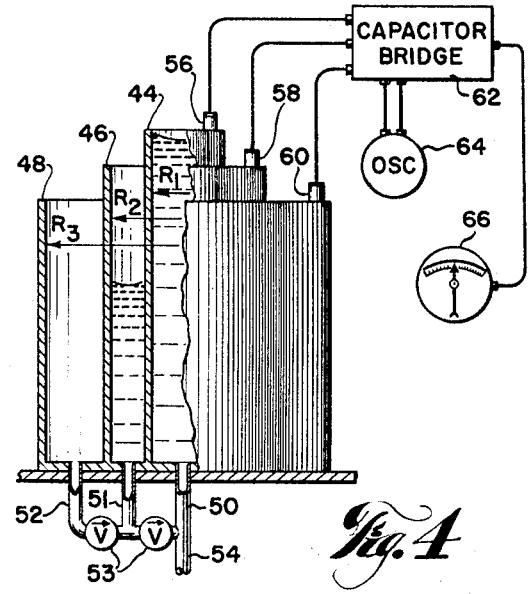
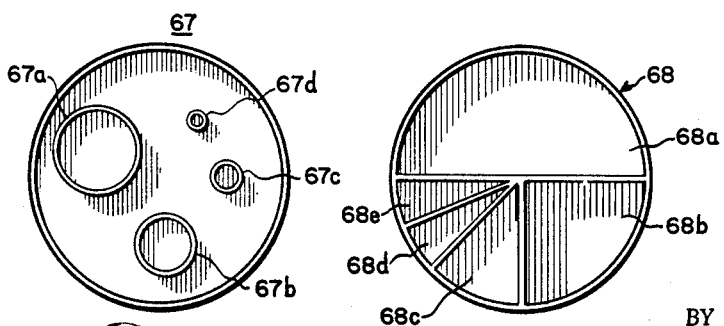
INVENTOR.
JOHN E. CLEMENS
BY James J. O'Reilly
AGENT June 25, 1968  J. E. CLEMENS  3,389,602

FUEL GAUGING SYSTEM FOR WEIGHTLESS TANKAGES

Filed April 20, 1964  2 Sheets-Sheet 2

INVENTOR.
JOHN E. CLEMENS
BY
James J. O'Reilly
AGENT

United States Patent Office 3,389,602
Patented June 25, 1968

3,389,602
FUEL GAUGING SYSTEM FOR
WEIGHTLESS TANKAGES
John E. Clemens, Xenia, Ohio, assignor to Industrial
Nucleonics Corporation, a corporation of Ohio
Filed Apr. 20, 1964, Ser. No. 361,060
18 Claims. (Cl. 73—290)

ABSTRACT OF THE DISCLOSURE

A fuel gauge for a fuel tank intended for use in a zero gravity environment. The tank is of the type having one or a plurality of baffles near the outlet of the tank so that when the tank is nearly empty the remnant fuel because of the effect of capillary attraction collects within the confines of the baffles. A liquid level probe is located within each baffle so that an accurate summation of the remaining fuel can be made. The probes can be of a known type such as capacitance, sonic or radiation attenuation or of a special ionization gauge disclosed herein. When the latter type is used the structure of the guage itself can form the baffle structure of the tank.

---

This invention relates to liquid fuel gauges and more particularly to apparatus for measuring the amount of fuel in the storage tank of a space vehicle during periods of weightlessness.

Modern-day space vehicles and intercontinental ballistic missiles are powered in the main by either solid or liquid fuels. These fuels are burned in a combustion chamber and expelled through a nozzle to propel the vehicle along a prescribed trajectory or orbit. The solid propellants do not pose the same handling problems that liquid fuels do. For example, liquid propellants must be stored in a tank and pumped from there to the rocket engine, while solid propellants can be stored in the combustion chamber and burned therein. Once the entire launching package has left the pad and staging of the several engines has occurred, the space vehicle will coast in free flight at a velocity which will either cause it to orbit the earth or give it a trajectory terminating in a predetermined impact area. In any event, during free-flight, the vehicle experiences weightlessness that has caused many problems, especially in manned space missions such as the recent Project Mercury series sponsored by the National Aeronautics and Space Administration.

One of these problems is that it has been difficult to control the liquid fuel stored in the vehicle since it tends to break up and randomly orient itself around the tank. It has been impossible to know how much fuel remains in the tank because of its random orientation therein. Moreover, the fuel may be located away from the pumping outlet at a time when thrust is needed for a roll, pitch or yaw correction. To cure this last mentioned problem, it has been proposed to confine the liquid by a variation of the capillary tube technique described in NASA Technical Notes D-1577 and D-1582, written by Donald A. Petrash et al. and published in January 1963. Briefly, various geometrical baffles are mounted over the pumping outlet to control the liquid-vapor interface in the tank. By constructing the baffles of a predetermined size and shape relative to the tank, it is possible to make the liquid continuously fill the baffle instead of flying around the tank. Essentially, the liquid tends to assume a configuration that makes the total surface energy a minimum. The baffles are usualy of different size so that the smallest baffle fills first and empties last.

Since the fuel is already confined in these baffles to make it immediately available for pumping to the engines, it is proposed to measure the fill level of each of these baffles in order to determine the amount of fuel remaining. It is appreciated that unless the combined capacities of the baffles is sufficient, there will be some fuel located outside the baffles that cannot be measured. It is therefore primarily when enough fuel has been used that all the remaining fuel will be located in the baffles that the present invention has particular utility. It is usually the case that greater accuracy of measurement is required at low fuel levels.

A number of different baffle level detectors are described. One type provides a unique ionization chamber construction that is integral with the baffle itself.

Accordingly, it is a primary object of the present invention to provide a fuel gauging system for a space vehicle operating in a zero-G environment.

It is another object of the present invention to provide a liquid level gauge that is more accurate than similar devices used heretofore.

It is yet another object of the present invention to provide an improved liquid fuel gauging system that is simple to construct.

It is still another object of the present invention to provide an improved liquid fuel gauging system that can be constructed of lightweight materials thereby reducing the payload requirements of launching equipment.

Other objects and advantages of the present invention will become more apparent upon reference to the following description when taken in conjunction with the drawings, in which:

FIG. 1 is a sketch of a space vehicle subject to periods of weightlessness;

FIG. 2 is a block diagram of a typical propulsion apparatus for the vehicle shown in FIG. 1 illustrating schematically the fuel gauging technique of the present invention;

FIG. 3 is a sectional view of a liquid fuel baffle useful in explaining the operation of the present invention;

FIG. 4 is an elevation of a concentric cylinder fuel baffling and measuring system constructed in accordance with the present invention;

FIG. 5 is a top view of a multi-cylinder fuel baffle;

FIG. 6 is a top view of a variable-size sector fuel baffle;

Figure 7:
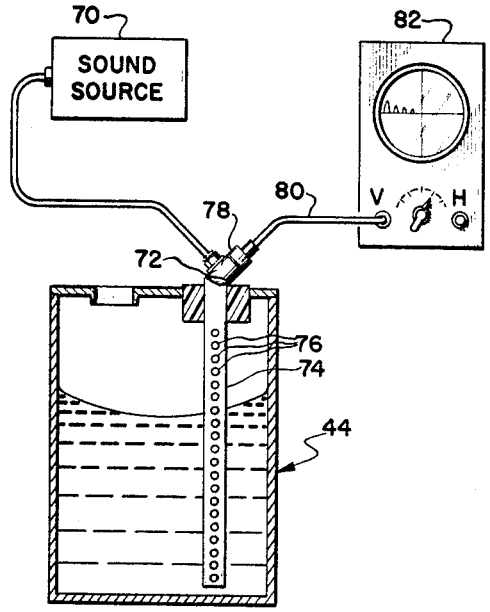
FIG. 7 is a diagrammatic elevation view, partly in section, showing an alternative fuel measuring system.

With reference now to the drawings and particularly to FIG . 1, there is shown a typical space vehicle launching operation. A rocket 10 is fired from a launch pad L for the purpose of either placing a payload such as a capsule 12 in orbit or striking an earth-based target T with a nuclear warhead 14. A control block-house 16 relays and receives data from the rocket or satellite via an r.f. link 18 concerning, for example, information on the trajectory 20. The rocket 10 spends most of its time in free-flight when used as a ballistic missile. The capsule 12 is weightless except during launch and re-entry.

These extended periods of weightlessness or zero-G make it difficult to know how much fuel remains available either to correct the trajectory 20 of the warhead or to maintain the orientation and attitude of the capsule 12. Referring to FIG. 2, a conventional propulsion system includes a fuel tank 22 and a combustion chamber 24. The combustion chamber 24 may be simply a hydrogen peroxide jet for correcting a capsule roll, for example. A pump 26 serves to transport liquid fuel from the tank 22 through a line 28. The fuel in the tank 22 may be liquid hydrogen, liquid oxygen or any of the hydrocarbon or hypergolic fuels commonly used. Under zero-G conditions, the liquid fuel splashes around the tank 22 and makes it difficult to determine the quantity of fuel left to complete a mission. To keep the fuel confined to a known region 22a of the tank for measurement, the present invention provides a capillary baffle 30 described in detail hereinafter. If there is any fuel in the tank, it will be in the baffle. Therefore I mount a probe 32 inside the baffle to sense the amount of fuel therein. Measuring circuitry 34 is coupled to the probe 32 and develops a fuel quantity signal on line 36 that can be either read out on a pilot's display device 38 or telemetered back to the block-house 16 for facilitating optimum trajectory computations.

The baffles 30 will hold the fuel under zero-G and up to small g-loadings before it loses control. During these periods, the sensor 32 and associated circuitry will provide an accurate indication of the amount of fuel in the baffle. Moreover, the fuel outlet 28 communicates with the baffle 30 so that if there is any fuel in the tank, it will be immediately available for consumption. Obviously, the measuring system can detect no more fuel than can be held in the baffle 30, but it is usually only necessary to be aware of a low fuel condition.

Before the construction of the fuel baffle 30 is taken up, consider the forces existing in a typical capillary system such as one cylinder 31 mounted within another as shown in FIG. 3. The direction of liquid motion in a capillary system such as that shown in FIG. 3 may be derived from a consideration of either capillary forces or surface energy. Because each method provides insight into behavior of the system, each will be derived hereinafter.

A sketch of a capillary system of the type under consideration, presents a general situation of a liquid with a contact angle $\theta$ and shows the forces, pressures, and system radii. If capital letters are used to denote quantities applicable to the annulus and small letters those applicable to the inside of the tube, the following equations may be written for the vertical forces at the solid-liquid-vapor interfaces:

$$f = 2\pi r \sigma_{lv} \cos \theta$$

where $\sigma_{lv}$ is the energy per unit area coefficient associated with the liquid-vapor interface and $r$ is the inside radius of the tube, and $$F = 2\pi (R+r) \sigma_{lv} \cos \theta$$

The pressure drop across each liquid-vapor interface may be obtained by dividing each equation by the respective area as follows:

$$P_a - p = \frac{2\pi r \sigma_{lv} \cos \theta}{\pi r^2} = \frac{2\sigma_{lv} \cos \theta}{r}$$

and $$P_a - P = \frac{2\pi (R+r) \sigma_{lv} \cos \theta}{\pi (R^2 - r^2)} = \frac{2\sigma_{lv} \cos \theta}{R-r}$$

The pressure difference tending to drive liquid up or down the tube ($P_a$ is common to both surfaces) is found as follows:

$$(P_a - p) - (P_a - P) = P - p = \frac{2\sigma_{lv} \cos \theta}{r} - \frac{2\sigma_{lv} \cos \theta}{R-r}$$

More simply, $$P - p = 2\sigma_{lv} \cos \theta \left[ \frac{1}{r} - \frac{1}{R-r} \right] \quad (1)$$

For a wetting liquid ($0° < \theta < 90°$), $\cos \theta$ is positive and, by inspection, the following behavior is evident: For $r < R/2$, $P - p > 0$ and the liquid will rise in the tube; for $r = R/2$, $P - p = 0$ and the liquid will neither rise nor fall; for $r > R/2$, $P - P < 0$ and the liquid will fall in the tube. For nonwetting liquids ($90° < \theta < 180°$) $\cos \theta$ is negative and thus the pressure drop and consequently the direction of liquid movement in the tube will be reversed.

It is interesting to note that Equation 1 is independent of gravity. Thus the direction of liquid motion is the same in zero gravity as in a gravity field; only the height of the liquid rise is affected by the gravity level.

Although Equation 1 adequately describes the direction of fluid motion, a better insight into the energy relation is obtained by deriving the relation for fluid movement in terms of the surface energies. Consider a change in liquid height in the tube $\Delta h$. The change in energy on the inside tube surface $\Delta s$ will equal the gain in energy due to covering the area $\Delta a$ with liquid minus the loss in energy due to the loss in vapor wetted area:

$$\Delta s = \Delta a \, \sigma_{ls} - \Delta a \, \sigma_{vs} = \Delta a (\sigma_{ls} - \sigma_{vs}) \quad (2)$$

where $\sigma_{ls}$ and $\sigma_{vs}$ are the energy per unit area coefficients associated respectively with the solid-liquid and vapor-solid interfaces. The values of the quantities $\sigma_{ls}$ and $\sigma_{vs}$ are unknown; however, they are related to the surface energy of the liquid and the contact angle by the Young-Dupre equation:

$$\sigma_{vs} - \sigma_{ls} = \sigma_{lv} \cos \theta \quad (3)$$

Substituting this expression in Equation 2 gives $$\Delta s = -\Delta a \, \sigma_{lv} \cos \theta \quad (4)$$

By a similar process for the annulus (considering an upward rise) the following is obtained:

$$\Delta S = -\Delta A \, \sigma_{lv} \cos \theta \quad (5)$$

The surface-area changes $\Delta a$ and $\Delta A$ are obtained in terms of the height changes $\Delta h$ and $\Delta H$, and Equations 4 and 5 become:

$$\Delta s = -2\pi r \, \Delta h \, \sigma_{lv} \cos \theta \quad (6)$$

and $$\Delta S = -2\pi (R+r) \Delta H \, \sigma_{lv} \cos \theta \quad (7)$$

The annular height change $\Delta H$ can be obtained in terms of the tube height change as follows:

$$\Delta H = -\Delta h \frac{r^2}{R^2 - r^2}$$

Substituting this expression in Equation 7 yields $$\Delta S = 2\pi \frac{r^2}{R-r} \Delta h \sigma_{lv} \cos \theta \quad (8)$$

The total energy change in the system is obtained by adding the energy changes $\Delta s$ and $\Delta S$ as follows:

$$\Delta s + \Delta S = -2\pi r \Delta h \sigma_{lv} \cos \theta + 2\pi \frac{r^2}{R-r} \Delta h \sigma_{lv} \cos \theta$$

When the terms are simplified and collected, $$\Delta s + \Delta S = -2\pi r^2 \Delta h \sigma_{lv} \cos \theta \left[ \frac{1}{r} - \frac{1}{R-r} \right] \quad (9)$$

The premise that the liquid-vapor system will seek a configuration of minimum total energy requires that the sum of the energy changes $\Delta s + \Delta S$ be negative. This condition is obtained in Equation 9 if the multiple of $\Delta h$, $\cos \theta$, and $$\frac{1}{r} - \frac{1}{R-r}$$

is positive. The term $\Delta h$ was taken as positive in the upward direction; thus for $0° < \theta < 90°$ the liquid will rise in the tube if $r < R/2$, remain stationary if $r = R/2$, and fall if $r > R/2$. For $90° < \theta < 180°$ the opposite situation is obtained. It is observed that the system breaks down for $\theta = 90°$ since the forces involved go to zero.

In accordance with my invention, I measure the fill height of the fuel in an inner cylinder, baffle 31. During zero-G conditions, it will be completely filled if the radii are properly chosen. At high ullages all of the fuel will be in the baffle which will be somewhat less than completely full. The present invention provides little utility when some of the fuel lies outside of the baffle. But it is usually only necessary to be notified only of a low fuel condition in which case the baffle with proper design will contain all of the available fuel.

The capacity of the baffle can be increased by adding one or more cylindrical baffles in the manner illustrated in FIG. 4. Here an inner baffle 44 is surrounded by an intermediate baffle 46 and an outer baffle 48. For convenience in pumping fuel under zero-G conditions, the baffles may be mounted over a fuel manifold comprising a plurality of outlet pipes 50, 51, and 52 communicating with the interior of the baffles and terminating in a common conduit 54 via a pair of one-way valves 53. Alternatively, openings in the bottom of the baffles would allow fuel to flow from one baffle to an inner one thereby eliminating the need for valving and manifolding devices. If the fuel is of the wetting variety, $\theta$ approaches 0°. If $R_1$, $R_2$ and $R_3$ are the radii of the iner baffle 44, the intermediate baffle 46 and the outer baffle 48, respectively, and constructed so that $R_1 < 2R_2 < 4R_3$, the innermost baffle 44 is the first to fill up and the last to empty. Therefore, the manifold drains the baffles from the outside in. It should be noted that the capillary fuel management technique described herein is most useful with small tanks as the holding force of the baffle walls is a function of their area while the mass of the fuel increases according to the volume thereof. The fuel will remain in the baffle under slight g-loadings that occur during a yaw or a pitch correction, but a sustained thrust of the main engines will very likely dislodge the fuel from the baffle and the gauge reading is not accurate.

One type of fuel level sensor may use elongated capacitance probes 56, 58 and 60 (FIG. 4) suspended down the length of each baffle. Each probe may include a pair of electrodes with the fuel serving as a dielectric. It may be observed that under zero-g conditions in space the contact angle $\theta$ is preserved the same as it existed before launch; however, the surface assumes a constant curvature. Each probe must therefore be located away from the baffle wall to measure the liquid at a point where the surface would be if it were level. The curvature could, of course, be compensated for in the calibration of the instrument. The effective capacitance of probe 58 changes as the fuel level drops in the intermediate baffle 46. Each probe has a capacitance proportional to the volume it measures. The total capacitance of all three probes wi'l then be proportional to the total amount of fuel in the baffles. A bridge circuit 62 driven by an oscillator 64 can be used to determine the combined probe capacitance. The total capacitance value can be indicated on a meter 66. A more detailed description of a liquid depth gauge of this type can be found in U.S. Patent 2,941,403 issued June 21, 1960 to J. Steenfeld et al.

My invention can be used with other than concentric cylindrical baffles. For example, FIG. 5 shows a fuel tank 67 containing a plurality of separate tubes 67a–67d and FIG. 6 shows a cylindrical baffle 68 having a plurality of chambers of decreasing size 68a–68e to provide the aforesaid fuel confinement under zero-G conditions.

My invention is neither restricted to a particular baffle configuration nor to the capacitance level gauge described above. It is obvious that there are numerous geometrical constructions that can provide the fuel confinement. The number of different fuel gauges that can be used is equally abundant. Having already set forth several baffle constructions, I will now describe several useful fuel level measurement devices. For simplicity, these devices are illustrated measuring the fuel level in a single cylindrical baffle such as the inner baffle 44 of FIG. 4. Their application to the plural baffle arrangement will be apparent to those skilled in the art.

Referring first to FIG. 7, a source of sound waves 70 is connected to a junction 72 at the upper end of a long strip 74 extending the length of the baffle 44. A plurality of holes 76 are provided down the strip to reflect sound waves propagating down from the junction 72. A transducer element 78 receives the reflected waves and generates a signal pulse over line 80 connected to the input of an oscilloscope 82. Those holes that are submerged in the fuel will not reflect energy back up to the transducer. The reflected pulses can be read out, as they are spaced in time due to their different path lengths. The latest pulse received is indicative of the position of the interface. This technique is described in detail in U.S. Patent 2,787,160 issued Apr. 7, 1957, to H. Van Valkenburg.

Figure 8:
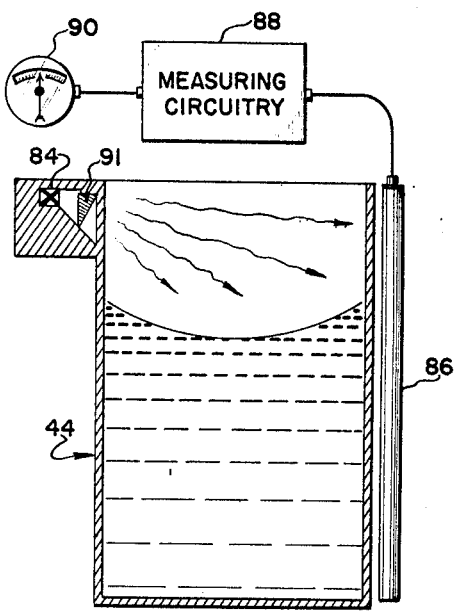
FIG. 8 is a diagrammatic elevation view, partly in section, showing another fuel measuring system.

FIG. 8 illustrates a radiation fill height gauge which includes a source of a radiation 84 and an elongated detector 86 such as a G-M tube. The detector is mounted on the outside of the baffle 44 opposite the source 84. Radiation striking the detector causes a current to flow which can be measured at 88 and indicated by a meter 90. As the fuel level drops, more radiation hits the detector and a higher current is indicated. A tapered block of shielding material 91 may be mounted between the source 84 and the baffle wall to linearize the relationship between fill height and detector response. This is described further in U.S. Patent 3,098,154 issued July 16, 1963, to Jack G. Crump and assigned to the same assignee as the present invention. To measure the fill height of two outer baffles 46 and 48 of FIG. 4, it is necessary to pass the radiation beam across a chord of these baffles so as not to measure the contents of the inner baffle 44.

Figure 9:
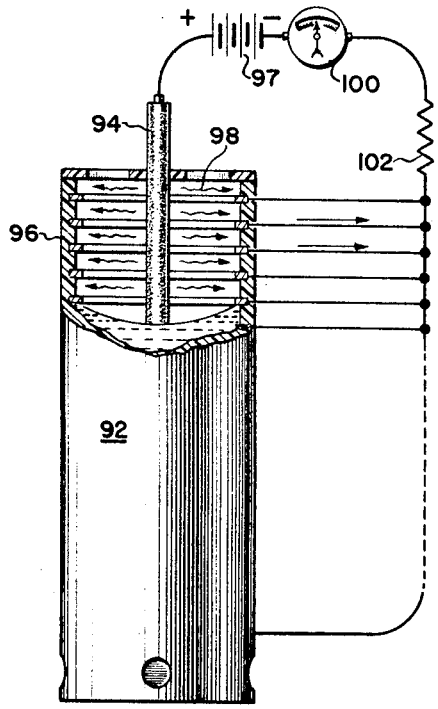
FIG. 9 is an elevation view, partly in section, of a radiation fuel height gauge of novel construction; and, FIG. 10 is an elevation view of a fuel gauging system combining the plural baffle arrangement of FIG. 4 and the fill height gauge shown in FIG. 9.

FIG. 9 illustrates a preferred radiation fill level gauge that is described and claimed in my copending application Ser. No. 361,032 filed Apr. 20, 1964 and assigned to the same assignee as the present invention. The gauge assentially employs a multiple ionization chamber construction. As usually constructed, an ionization chamber includes a pair of separated electrodes having an electric potential impressed thereon. The space between the electrodes is occupied by a gas such as argon which ionizes when subjected to radiation thereby enabling current flow between the electrodes. By monitoring the amount of current flowing it is possible to ascertain the strength of the radiation field at the detector. A material having a property to be measured is placed in the gap between the radiation source and the chamber to modulate the source field in accordance with the variations in the property. However, in the present invention, the source of radiation comprises one electrode of the chamber and the fluid to be measured occupies the space between the chamber electrodes.

In the construction of gauge 92, a hollow cylindrical housing of electrically insulative material substantially encircles a center electrode 94. A plurality of electrically conductive rings 96 are embedded in the housing and a battery 97 is connected between the center electrode and each of the rings 96 to provide a polarizing potential. A radioactive substance such as strontium 90 is coated onto the center electrode 94 to ionize the vapor above the fuel. The radiation field 98 causes a substantial electrical current to flow in those rings not immersed in the fuel. A microammeter 100 in series wi.h the battery 97 and a current limiting resistor 102 can be used to indicate the liquid level in the gauge 92. The magnitude of current flow is inversely proportional to the fill level which can be measured to an accuracy within the granularity of the ring spacing. It can be seen that each ring together with the center electrode 94 constitutes an ionization chamber.

Figure 10:
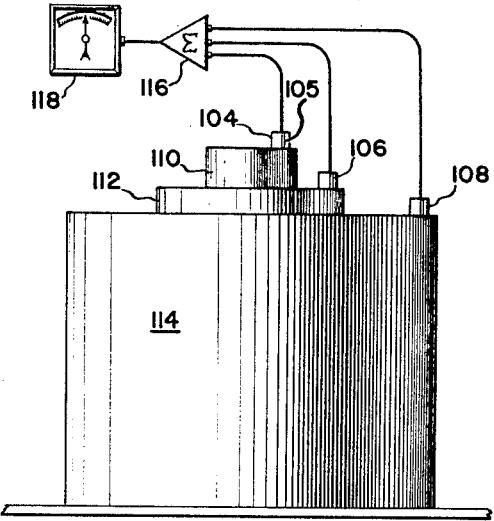

In zero-G applications with which we are here concerned, the gauge itself may be used as a fuel baffle; however, since the diameter of the housing must be kept small to obtain a sensitive instrument, it may be advisable to use the gauge 92 as a fuel probe that can be mounted directly in the fuel baffles. FIG. 10 shows three such probes 104, 106 and 108 inserted in cylindrical baffles 110, 112 and 114. The probes each generate a current proportional to the volume of fuel it measures. The outputs of all the probes can be connected to a current summing amplifier 116. An indicator 118 reads the total probe current which is directly proportional to the baffle ullage. It may be necessary to provide a vertically extending slot 105 in each probe to keep the probe itself from becoming an effective baffle. Alternatively, a semicylindrical probe construction could be utilized.

Many other modifications may be made to the preferred embodiments of the present invention without departing from the true spirit and scope thereof or relinquishing any of the advantages attendant thereto.

I claim:

1. A gauge for measuring fuel in a partially filled tank, comprising:
   a tank for storing said fuel,
   capillary baffle means mounted inside said tank for confining said fuel during zero-G conditions,
   probe means adjacent to said baffle means for measuring the amount of said fuel in said baffle means, and
   means coupled to said probe means for providing a signal indicative of the amount of fuel in said baffle means.

2. A fuel gauge as set forth in claim 1 in which said probe means comprises a capacitance gauge.

3. A fuel gauge as set forth in claim 1 in which said probe means comprises:
   a source for generating sound energy,
   a strip positioned longitudinally in said baffle and having a plurality of holes for reflecting sound energy,
   means coupling said source to said strip for propagating said sound energy downwardly along said longitudinally positioned strip toward said confined fuel, and
   means receiving said strip-reflected sound energy and responsive to the arrival time relative to the time of generation thereof for indicating the level of said fuel in said tank.

4. A fuel gauge for a space vehicle having a tank for storing fuel comprising:
   capillary baffle means mounted inside said tank for confining said fuel during zero-G conditions, and
   probe means adjacent to said capillary baffle means for providing a signal proportional to the amount of fuel confined in said baffle means.

5. A fuel gauge for a space vehicle, comprising:
   a tank for storing said fuel,
   capillary baffle means mounted inside said tank for confining said fuel during zero-G conditions,
   probe means adjacent to said capillary baffle means for measuring the height of said fuel in said baffle means, said probe measuring means including,
      a radioactive source providing a beam of penetrating radiation directed into said baffle and
      a detector positioned to receive radiation passing through said baffle and said confined fuel and mounted longitudinally along the upright dimensions of said tank,
   means responsive to the radiation received by said detector for developing a signal indicative of the level of said fuel in said baffle, and
   means receiving said detector signal for indicating the total amount of fuel in said baffle.

6. A fuel gauge for a space vehicle having a tank for storing fuel comprising:
   a tank for storing said fuel,
   baffle means inside said tank for confining said fuel during zero-G conditions,
   radiation probe means including,
      a cylindrical housing mounted inside said baffle means, having openings permitting said fuel to partially submerge said housing and extending axially of said baffle from the bottom thereof,
      a plurality of outer electrodes mounted down the inside of said cylindrical housing in vertical alignment, and
      an inner electrode emitting radiation toward said outer electrodes,
   circuit means for impressing an electric potential across said inner electrode and said outer electrodes, said radiation causing current to flow in those electrodes not submerged in said fuel, and
   means for summing the current flowing through all of said outer electrodes to provide a signal proportional to the total amount of fuel in said baffle.

7. A fuel gauge as set forth in claim 6 in which each of said outer electrodes comprises:
   an annular ring of small vertical dimension relative that of said housing.

8. A fuel gauge as set forth in claim 6 in which said center electrode comprises:
   a wire coated with a beta-emitting radioisotope.

9. Apparatus for measuring the amount of fuel in a tank during zero-G conditions comprising:
   a plurality of capillary baffle means mounted inside said tank to confine said fuel during said zero-G conditions,
   a plurality of probes each mounted adjacent to a separate one of said capillary baffle means for producing a signal indicative of the amount of fuel in said baffle, and
   means responsive to said signals for indicating the total amount of fuel in said plurality of baffles.

10. Apparatus as in claim 9 wherein each of said baffle means has a different cross-sectional area, whereby said baffles are adapted to contain different amounts of fuel when filled.

11. Apparatus as in claim 9 in which said plurality of capillary baffle means comprise:
   a plurality of concentric cylinders of different radii.

12. Apparatus as set forth in claim 9 in which said capillary baffle means comprises:
   a plurality of concentrically mounted cylindrical baffles, each of said inner baffles having a radius less than one-half the radius of an outer baffles immediately surrounding said inner baffle.

13. Apparatus for measuring the amount of fuel in a tank during zero-G conditions, comprising:
   a plurality of capillary baffles mounted inside said tank, each of said baffles having a different cross-sectional area to confine said fuel during said zero-G conditions,
   a plurality of probes each mounted adjacent to a separate one of said capillary baffles for producing a signal indicative of the amount of fuel in said baffle, and
   means for combining said signals to provide an indication of the total amount of fuel in said baffles.

14. Apparatus for measuring the amount of fuel in a partially filled tank of a space vehicle during zero-G conditions, comprising:
   a plurality of cylindrical capillary baffles mounted inside said tank, each of said baffles having a different cross-sectional area to confine all of said fuel during said zero-G condition,
   a plurality of radiation probe means each positioned in one of said baffles to provide signals proportional to the amount of fuel in each of said cylindrical baffles,
   amplifier means for summing said signals to provide an output signal, and
   means responsive to said output signal to provide an indication of the total amount of fuel in said tank.

15. Apparatus as in claim 14 in which each of said radiation probe means comprises:
   an inner electrode emitting radiation and extending down the length of said baffle, and
   a plurality of outer electrodes spaced from said inner electrode and positioned in vertical alignment down the length of said baffle, each of said outer electrodes not submerged in said fuel providing a flow of electrical current.

16. Apparatus as set forth in claim 14 wherein said baffles are mounted over the fuel outlet of said tank to provide a supply of fuel under zero-G conditions.

17. Apparatus as in claim 14 wherein said baffles comprise: a plurality of concentrically mounted cylinders, each of said inner cylinders having a radius less than one-half the radius of an outer cylinder immediately surrounding said inner cylinder.

18. Apparatus for measuring the amount of fuel in a partially filled tank during zero-G conditions, comprising: a baffle including
- a generally cylindrical housing mounted within said tank for confining said fuel during said zero-G conditions,
- a plurality of outer electrodes mounted down the inside of said housing and
- an inner electrode emitting radiation toward said outer electrodes,
- circuit means for impressing an electrical potential between said inner electrode and said outer electrodes to cause a flow of electrical current in those outer electrodes not submerged in said fuel, and
- means responsive to said electrical current flows for indicating the total amount of fuel in said baffle.

References Cited

UNITED STATES PATENTS

| | | | |
|---|---|---|---|
| 2,787,160 | 4/1957 | Valkenburg | 73—290 |
| 3,237,451 | 3/1966 | Haeff | 73—290 |
| 3,279,253 | 10/1966 | Blackmon et al. | 73—304 |

OTHER REFERENCES

Petrach et al., N.A.S.A. Technical, note D-1577, January 1963. Pages 2, 3, 4, 11, 12, 13 and 14 relied upon. Copy in Scientific Library, TL 521 A35t.

DAVID SCHONBERG, *Primary Examiner.*

LOUIS R. PRINCE, *Examiner.*

S. C. SWISHER, *Assistant Examiner.*